United States Patent
Gao et al.

(10) Patent No.: US 6,912,715 B2
(45) Date of Patent: Jun. 28, 2005

(54) SYSTEM AND METHOD FOR WEB-BASED REMOTE PROCEDURE CALL (RPC)

(75) Inventors: Yang Gao, Fremont, CA (US); Zheng John Shi, San Francisco, CA (US); Shun Gao, San Jose, CA (US); Armeen Mazda, Tiburon, CA (US)

(73) Assignee: Appeon Corporation (HK)

(*) Notice: Subject to any disclaimer, the term of this patent is extended or adjusted under 35 U.S.C. 154(b) by 621 days.

(21) Appl. No.: 09/916,252

(22) Filed: Jul. 30, 2001

(65) Prior Publication Data

US 2003/0056030 A1 Mar. 20, 2003

(51) Int. Cl.⁷ .............................................. G06F 9/54
(52) U.S. Cl. ......................... 719/311; 719/330; 709/219
(58) Field of Search ................................. 719/310–320, 719/330; 709/200–203, 217–219, 228; 715/760; 707/10

(56) References Cited

U.S. PATENT DOCUMENTS

| | | | | |
|---|---|---|---|---|
| 6,272,493 B1 | * | 8/2001 | Pasquali .................. | 707/10 |
| 6,535,882 B2 | * | 3/2003 | Pasquali .................. | 707/10 |
| 6,636,856 B2 | * | 10/2003 | Pasquali .................. | 707/10 |
| 6,639,610 B1 | * | 10/2003 | Sponheim et al. ........ | 715/760 |
| 6,658,419 B2 | * | 12/2003 | Pasquali .................. | 707/10 |
| 6,763,388 B1 | * | 7/2004 | Tsimelzon ................ | 709/228 |

OTHER PUBLICATIONS

Hatcher, Erik, "Remote Scripting Using a Servlet" Feb. 1, 2001, pp. 1–13 (including attached code listings 3–6, & 8) http://www-106.ibm.developerworks/library/wa-resc/?dw-zone=web.*

* cited by examiner

Primary Examiner—St. John Courtenay, III
(74) Attorney, Agent, or Firm—Patterson, Thuente, Skaar & Christensen, P.A.

(57) ABSTRACT

The present invention permits a Remote Procedure Call (RPC) to be executed from a Web page displayed in a standard Microsoft Web browser window, without adding a URL to the Web browser's history list. In one aspect of the invention, a HTML <form> element is used to transmit the HTTP request to the server and a HTML <iframe> element is used to receive the HTTP response. Traditionally, each data transmission received by a HTML <iframe> element is logged to the history list. This is problematic as it clutters the history list, compromises the functionality of the browser "Back" and "Forward" buttons, and results in undesirable server operations to be executed. The present invention utilizes the HTML <iframe> element such that data is received without adding a URL to the history list. The present invention can be used to build a lightweight Web page that offers real-time data and interactivity.

7 Claims, 1 Drawing Sheet

SYSTEM AND METHOD FOR WEB-BASED REMOTE PROCEDURE CALL (RPC)

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to transmitting information over computer networks, and more particularly, to a system and method for executing a remote procedure call (RPC) from a Web page displayed in a Web browser to a server.

2. Description of the Related Art

The Internet is a computer network that provides access to the World Wide Web ("the Web"); a vast collection of pages comprised of text, hyperlinks, graphical elements, input elements (e.g. HTML text box), and program code (e.g. JavaScript). Graphical user interface programs called Web browsers are employed by Internet users to receive, or download, the Web pages from servers and display the pages at their client devices. A Web browser displays Web pages by interpreting the HTML document and executing any program code, which results in the showing text, hyperlinks, graphical elements, and input elements on a client display screen.

The rapid increase in the number of Internet users and the ubiquity of the Web browser have prompted companies to adopt Web pages for delivering, to end-users, time-sensitive information and mission-critical software applications. These Web-based applications generally require numerous transmissions of data between a server and the Web browser. Traditionally, for each transmission of data, a new page must be transmitted back to the user or their existing page must be refreshed. This traditional data transmission model, when used in the context of delivering web-based applications to end-users, greatly increases the number of redundant Web page refreshes. Web page refreshes are problematic, because they result in unnecessary server and bandwidth utilization, and force the user to wait for redundant pages to load. This negatively impacts the Web-based application's effectiveness and the Internet user's productivity, while compromising network efficiency and scalability.

Several developments illustrate the great effort at reducing redundant page refreshes and for providing a rich interactive user experience for Web pages without utilizing Web browser plug-ins, such as Macromedia's Flash player or Microsoft's ActiveX controls. One of which was developed and promoted by Microsoft. Microsoft developed a Java Applet-based technology called "Remote Scripting", which allows information to be exchanged between a displayed Web page and the server, without having to refresh the page. After several years of promotion by Microsoft, however, "Remote Scripting" technology has not been widely adopted by Web developers. There are several reasons for this:

1. Slow: In order to use "Remote Scripting," each Web page must include a Java Applet, acting as the client-side communication proxy, which must initialize Java Virtual Machine at the client's computer. Initialization of Java Virtual Machine and loading of the Java Applet is a slow process that introduces an undesirable delay in displaying the Web page for most personal computers.
2. Limited Server Compatibility: "Remote Scripting" only supports Microsoft Web server software, such as Microsoft's IIS (Internet Information Server). Most high traffic and established commercial Websites, however, use a non-Microsoft platform or wish not to be limited to only using the Microsoft platform in the future.

As a result of these serious limitations, most Web-based applications do not or cannot take advantage of Microsoft's "Remote Scripting" technology.

Consequently, the most common method for achieving real-time Web page interactivity today, without Web browser plug-ins, is by using a <iframe> element. The <iframe> element serves as the communication proxy for the Web browser. Data is transmitted to the server by utilizing a <form> element and either the "post" or "get" method. Alternatively, one could transmit data to a Web page without utilizing the <form> element by dynamically changing the "src" attribute of an <iframe> element at the Web browser. The <iframe> method for data transmission overcomes the limitations of Microsoft's "Remote Scripting," but introduces one new serious limitation, which greatly compromises the operation of Microsoft's Web browser.

Specifically, each time new information is loaded into an <iframe> element, a record or URL (Universal Resource Locator) is added to the Microsoft Web browser's history list. That is, the browser is now adding every action performed from the Web page to the history list, rather than just each unique Web page. Thus, since each unique Web page may make several data transmissions, several history records are now being associated with each unique Web page. This is problematic in the context of Web-based applications for the following reasons:

1. Clutters the history list: users must navigate through a large directory tree full of redundant entries before finding the desired Web page.
2. Compromises Web page navigation: users must repeatedly click on the "Back" or "Forward" buttons before being able to leave the current Web page.
3. Produces undesirable application operations: users will trigger duplicate operations at the server (e.g. charge my credit card) when navigating with the browser's "Back" and "Forward" buttons.

These problems affect many Internet users today as the majority of these users utilize a Microsoft Web browser. Furthermore, as Netscape winds down its Web browser business and Microsoft becomes the de facto Web browser, this problem will soon plague every single Internet user, and thus cannot be ignored.

Consequently, NetGratus Inc. developed a method for transmitting data to and from a server by utilizing the <script> element as the communication vehicle. This method prevents unwanted history records from being added to the browser's history list, however, introduced a new limitation. When data is transmitted via the <script> element, the Web page is limited in the amount of data it can transmit to a server. This is due to the fact that the <script> element utilizes the "get" method to transmit data. If the "post" method could also be utilized to transmit data, however, data could be transmitted to and from a displayed Web page without limitation of size.

From the discussion above, it should be apparent that there is a need for better method of transmitting data between a displayed Web page and the server over HTTP. Specifically, a method that offers at least the same benefits of the <iframe> method, without disrupting the Microsoft Web browser's history list. The present invention fulfills this need.

BRIEF SUMMARY OF THE INVENTION

The invention permits a Web page to make JavaScript-based remote procedure calls (RPC) from Microsoft Web browsers to a server by using the HTML <form> and <iframe> elements, without adding a record (or Universal Resource Locator, URL) to the browser's history list. The Web page essentially uses HTML <form> and <iframe> elements as the communication vehicle for sending and receiving data to and from the Web server. As part of this invention, it enables submission of data to a server such that the response is no longer delivered onto a new HTML page, but rather to a hidden HTML <iframe> element.

This invention enables web developers to create web-based applications that utilize a pure-Internet architecture (i.e. where the thin client utilizes only JavaScript and HTML) that yield a traditional fat client application experience, without all the weight and limitations of the fat client. This is accomplished by, returning new information from server-side business logic to the displayed HTML page, and by using JavaScript/DHTML to alter the presentation layer accordingly. More specifically, this invention allows for data to be submitted to a particular procedure residing at a server, and return the response from that procedure to the displayed Web page over HTTP.

This invention enables these interactions between the Web page and server by utilizing a client-side proxy, the client's communication agent, and a server-side proxy, the server's communication agent. The client-side proxy is ultra-fast and ultra-light since it is built using 100% JavaScript and HTML (<form> and <iframe> elements) technology. The server-side proxy can be implemented on virtually any platform, such as dynamic server pages (e.g. ASP, PHP, JSP, CFM, etc.), ISAPI-based C/C++, Java technologies, and so on.

DETAILED DESCRIPTION OF THE INVENTION

Figure 1:
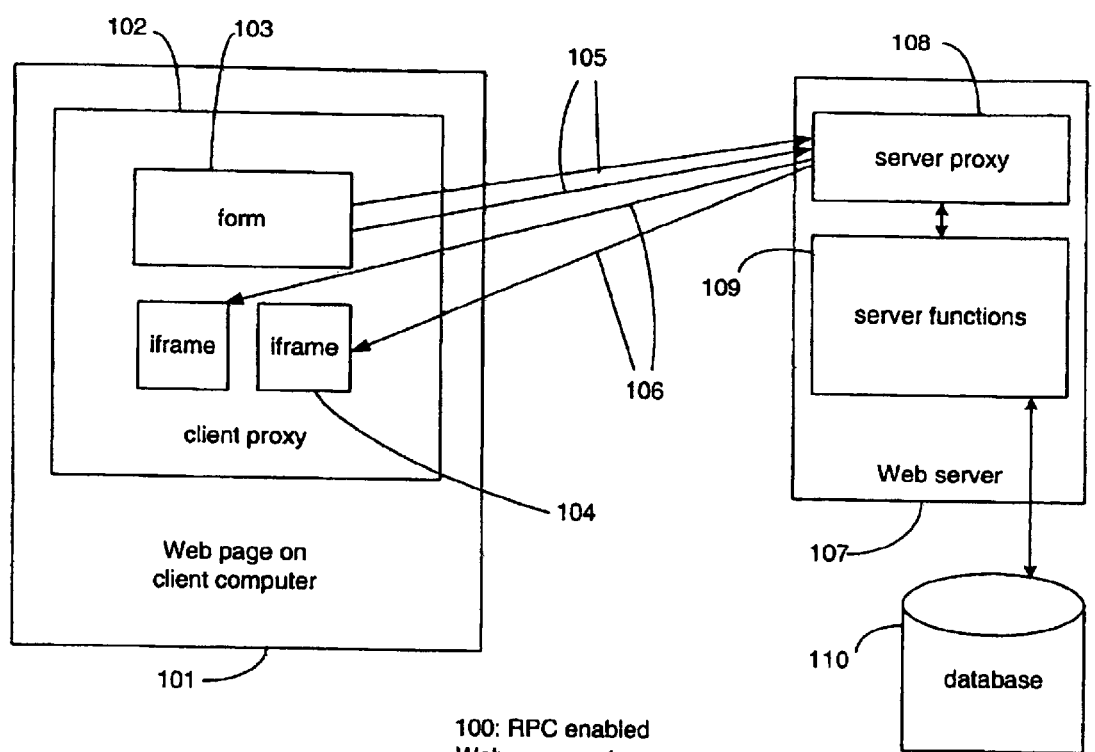
FIG. 1 shows a system having a Web page on client computer and Web server constructed in accordance with the present invention.

Typically, a Web page sends data from a web page to the server when an HTML form is submitted. This usually occurs when the user clicks the submit button of the HTML form. Once the submit button has been clicked, the browser collects the values from the form fields, builds an HTTP request, and then sends that request to the server. The server receives the information, does what it needs to do—querying a database for example—and then returns the result of the form submission, usually in the form of a new HTML page.

This invention uses the HTML <form> element in conjunction with a hidden HTML <iframe> element to yield completely different results than previously. Upon a trigger event, such as a mouse-over or a button click, the Web page now places a remote procedure call (RPC) through a client-side proxy, and will receive the results in a hidden <iframe> element, such that the displayed page is no longer refreshed. Additionally, using the <iframe> element to receive the results will no longer add a record of the RPC or URL to the browser's history list.

Once the RPC has been triggered, the client-side proxy includes the necessary parameters for executing the RPC, including the location and name of the remote procedure, the data being passed to the remote procedure, the callback function name, etc. The client-side proxy must also prepare to receive the returned data. It dynamically generates a hidden HTML <iframe> element at the Web browser, and sets the <form> element's "target" property to the <iframe> element.

Now that the client-side proxy is prepared to send the request and receive the response, the <form> element is used to send the request to the Web server. Although the "post" or "get" request method can be used to submit the form; this invention utilizes the "post" method so that the data submitted to the server may exceed 1 kilobyte in size.

Once the HTTP request arrives at the Web server it is passed to the server-side proxy. First, the server-side proxy parses the HTTP request to extract the necessary parameters. Then it regenerates the RPC as if it were a local procedure call. After the call has dispatched, the server-side proxy receives the returned data from the procedure, packages that data in a format, which is understood by the client-side proxy, and returns that data package or response via HTTP to the <iframe> element.

When the data is received by the <iframe> element, a callback function is invoked to process the returned data. The callback function is a JavaScript function of the Web page, which will process the returned data. It may display the data to the user, or use it carry out another task, such as performing another calculation (at the client or server). This entire process is accomplished without having to refresh the page.

Now, in order to avoid adding a URL to the browser's history list, a given <iframe> element can only be used once per RPC. Therefore, for each new RPC, the client-side proxy generates a new <iframe> element at the Web browser, and deletes the previous instance of the <iframe> element, as if the previous <iframe> element had never existed. Although a new <iframe> must be used for each RPC, the same <form> element may be used over and over. This unique practice and method for disposing of the <iframe> element is a key aspect of this invention, which greatly increases the usability of a Microsoft Web browser. Specifically, it prevents the history list from becoming cluttered with frivolous records or URLs associated with each RPC, and more importantly, it maintains the usability of the browser's "back" and "forward" buttons for navigating between Web pages.

System Configuration

FIG. 1 shows a system 100 having a Web page on client's computer 101 and one Web server 107. Web page 101 includes a client-side proxy 102, which contains HTML <form> 103 and <iframe> 104 elements. Client-side proxy 102 can communicate with the Web server 107. The client-side proxy 102 assembles the HTTP request and sends it to the Web server via <form> element 103. The Web server utilizes server-side proxy 108, which handles HTTP the requests from client-side proxy 102 and dispatches the procedure calls to various server procedures 109. Server procedures 109 can access data sources, such as database 110, and return those results to server-side proxy 108. The server-side proxy 108 then packages the results into a format understandable by the client-side proxy 102, and returns that data package to the client-side proxy. The <iframe> element 104 at the client-side proxy 102 then accepts the data returned from the server-side proxy 108. Once this data is loaded into the <iframe> element 104, it is accessible to client-side processes and a callback function is triggered at the client-side proxy 102 to process returned data.

System Implementation

The next section shows a sample code for implementing the client-side proxy 102. The received data is stored in the <iframe> element until the new <iframe> element is generated by the next RPC. The <iframe> element is only used once to prevent adding a record of the RPC or URL to the Web browser's history. The code below is taken from the sample Web page "client.htm."

As shown in the above sample codes for both Web page 101 and the client-side proxy 102, the client-side proxy 102 uses a <form> element 103 as the postman to send data to the Web server and uses <iframe> element 104 as the receiver to receive the returned data from the server proxy 108. This invention uses the <form> and <iframe> elements together in a combined new and innovated way to transmit data between the displayed Web page and a server, and more specifically to make an RPC, without adding a URL to the Web browser's history list.

Each time a Web page makes a RPC, the client-side proxy 102 generates an HTTP request that includes the location and name of the remote procedure, any data to be passed to the remote procedure, and the callback function name. This HTTP request is posted to Web server 107 through the submission of <form> element 103. The response arrives to <iframe> element 104 and triggers the specified callback function, so that Web page 101 can process the returned data.

The server-side proxy 108 can be implemented by any Web server-side technologies, such as, ASP, PHP, JSP, EJB, ISAPI, and so on. The next section shows an implementation

```
<html>
    <script>
        var ifrCount=0
        function _I(callback, param)
        {
            window.status="";
            eval(callback + "('" + param + "')");
        }
        function LMLPost(serverPage, callback, serverFunction, data)
        {
            var strHTML=new String();
            if(!document.forms.LMLform)
            {
                strHTML="<div><form name=\"LMLform\"
                    method=\"post\"action=\""+ serverPage + "\">";
                strHTML+="<input type=\"hidden\"name=\"func\">";
                strHTML+="<input type=\"hidden\"name=\"params\">";
                strHTML+="<input type=\"hidden\"name=\"callback\">";
                strHTML+="</form></div>";
                document.body.insertAdjacentHTML("BeforeEnd",strHTML)
            }
            if(ifrCount>0)
                document.all('div_'+(ifrCount-1)).innerHTML="";
                document.forms.LMLform.func.value = serverFunction;
                document.forms.LMLform.params.value = data;
                document.forms.LMLform.callback.value = callback;
                strHTML="<div id='div_"+ifrCount+"'><iframe
                    style=\"position:absolute;visibility:hidden;left:0;top:0\"
                    name = '" + ifrCount +"'></iframe></div>";
                document.body.insertAdjacentHTML("BeforeEnd",strHTML);
                document.forms.LMLform.target="+ifrCount;
                document.forms.LMLform.submit();
                ifrCount++;
        }
        function pos_data()
        {
            LMLPost("hello.asp", "my_callback", "getData",
                document.all('input_buffer').value);
        }
        function my_callback(data)
        {
            document.all('output_buffer').value = data;
        }
    </script>
    <body>
        <textarea name='input_buffer'rows=8></textarea>
        <textarea name='output_buffer'rows=8></textarea>
        <input type='button'value='Post'onclick="post_data();">
    </body>
</html>
``` of server-side JavaScript code running on Microsoft's IIS Web server. It can be easily ported to other Web server-side technologies. The following code is taken from the server proxy file "serverproxy.inc."

```
<% @ Language=JavaScript %>
<%
    var _LML_PARAMS_DELIM = String.fromCharCode(1);
    var i, strBody, strResult;
    var strFunc, strCallback;
    var strParams, arrParams;
    strFunc = Request("func").item;
    strParams = Request("params").item;
    strCallback = Request("callback").item;
    arrParams = strParams.split(_LML_PARAMS_DELIM);
    strParams = "";
    for (i = 0; i < arrParams.length; i ++)
    {
        if (i > 0)
            strParams += ",";
        strParams += "\"" + EscapeSpecialChars(arrParams[i]) + "\"";
    }
    strResult = escape(eval(strFunc + "(" + strParams + ")"));
    strBody = "<HTML><HEAD></HEAD>";
    strBody += "<BODY onload=parent.window._l(";
    strBody += "\"" + strCallback + "\",";
    strBody += "\"" + strResult + "\"";
    strBody += ")>";
    strBody += "</BODY></HTML>";
    Response.Write(strBody);
    function EscapeSpecialChars(strSrc)
    {
        var strDest = strSrc;
        strDest = strDest.replace(/\\/g, '\\\\');
        strDest = strDest.replace(/\r/g, '\\r');
        strDest = strDest.replace(/\n/g, '\\n');
        strDest = strDest.replace(/"/g, '\\"');
        strDest = strDest.replace(/'/g, '\\\'');
        return strDest;
    }
%>
```

The next section shows the sample code for server function 109. This is an implementation for Microsoft IIS and ASP. It can be easily ported to other Web server-side technologies. The first line is used to include the source code of server proxy 108. The simple "getData" function herein returns whatever data it takes as the input argument. The code below is taken from the sample server page "server.asp."

```
<!--#include file="serverproxy.inc"-->
<script runat=Server language=VB Script>
    function getData(strPara)
        getData = strPara
    end function
</script>
```

The above sample codes illustrate a sequential RPC process. By using additional <form> and <iframe> elements, however, the client-side proxy 102 can make multiple simultaneous RPCs. Although the source code above enables a Web page to directly access server-side procedures through the "post" request method, with little modification, it can also enable a Web page to directly access services provided by server-side objects through the "get" request method.

The present invention has been described above in terms of presently preferred embodiments so that an understanding of the present invention can be conveyed. There are, however, many configurations for network data delivery not specifically described herein, but with which the present invention is applicable. The present invention should therefore not be seen as limited to the particular embodiments described herein, but rather, it should be understood that the present invention has wide applicability with respect to network data delivery generally. All modifications, variations, or equivalent arrangements and implementations that are within the scope of the attached claims should therefore be considered within the scope of the invention.

We claim:

1. A method for transmitting data between a Web page displayed within an application window at a client device and a server, the method comprising:

containing, in the application window of said client device, at least one Web page;

transmitting, to said server, an HTTP request initiated by an HTML <form> element; and, receiving, from said server, output of an HTTP response associated with said HTTP request into an HTML <iframe> element, wherein the transmitting and receiving actions are accomplished without adding a Universal Resource Locator (URL) to a application history list.

2. A method as defined in claim 1, wherein said application window is a Web browser window.

3. A method as defined in claim 2, wherein said HTML <form> element in the transmitting action and said HTML <iframe> element in the receiving action are contained within the same Web page.

4. A method as defined in claim 2, wherein said HTML <form> element in the transmitting action and said HTML <iframe> element in the receiving action are contained within different Web pages.

5. A method as defined in claim 3 or 4, wherein the transmitting and receiving actions are repeated without adding a URL to a Web browser history list.

6. A method as defined in claim 3 or 4, wherein a procedure or set of program code residing at said server is identified by said HTTP request and invoked.

7. A method as defined in claim 6, wherein the said procedure or set of program code is not contained in a server page identified by said HTTP request.

* * * * *

UNITED STATES PATENT AND TRADEMARK OFFICE
CERTIFICATE OF CORRECTION

PATENT NO. : 6,912,715 B2
DATED : June 28, 2005
INVENTOR(S) : Yang Gao et al.

It is certified that error appears in the above-identified patent and that said Letters Patent is hereby corrected as shown below:

Column 8,
Lines 46 and 49, delete "claim" and insert -- claims --.

Signed and Sealed this

Fifteenth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,912,715 B2
DATED : June 28, 2005
INVENTOR(S) : Yang Gao et al.

It is certified that error appears in the above-identified patent and that said Letters Patent is hereby corrected as shown below:

Column 8,
Lines 43and 46 delete "claim" and insert -- claims --.

This certificate supersedes Certificate of Correction issued November 15, 2005.

Signed and Sealed this

Twenty-fifth Day of April, 2006

JON W. DUDAS
*Director of the United States Patent and Trademark Office*